United States Patent
Koelbl et al.

(10) Patent No.: US 11,556,676 B2
(45) Date of Patent: Jan. 17, 2023

(54) SCALABLE FORMAL SECURITY VERIFICATION OF CIRCUIT DESIGNS

(71) Applicant: Synopsys, Inc., Mountain View, CA (US)

(72) Inventors: Alfred Koelbl, Hillsboro, OR (US); Naiyong Jin, Marlborough, MA (US); Sudipta Kundu, Hillsboro, OR (US)

(73) Assignee: Synopsys, Inc., Mountain View, CA (US)

( * ) Notice: Subject to any disclaimer, the term of this patent is extended or adjusted under 35 U.S.C. 154(b) by 52 days.

(21) Appl. No.: 17/011,263

(22) Filed: Sep. 3, 2020

(65) Prior Publication Data

US 2021/0064790 A1     Mar. 4, 2021

Related U.S. Application Data

(60) Provisional application No. 62/895,569, filed on Sep. 4, 2019.

(51) Int. Cl.
| | |
|---|---|
| *G06F 30/3323* | (2020.01) |
| *G06F 119/02* | (2020.01) |
| *G06F 21/78* | (2013.01) |
| *G06F 21/75* | (2013.01) |
| *G06F 30/33* | (2020.01) |
| *G06F 21/62* | (2013.01) |

(52) U.S. Cl.
CPC .......... *G06F 21/78* (2013.01); *G06F 21/6218* (2013.01); *G06F 21/75* (2013.01); *G06F 30/33* (2020.01); *G06F 30/3323* (2020.01); *G06F 2119/02* (2020.01)

(58) Field of Classification Search
USPC .......................................................... 716/106
See application file for complete search history.

(56) References Cited

U.S. PATENT DOCUMENTS 9,449,196 B1 *   9/2016   Purri ....................... G06F 21/76

OTHER PUBLICATIONS

Bloem, R. et al., "Formal Verification of Masked Hardware Implementations in the Presence of Glitches," Springer, Cham, Lecture Notes in Computer Science, 2018, 31 pages, vol. 10821.
Goguen, J. A. et al., "Security Policies and Security Models," 1982 IEEE, Symposium on Security and Privacy, 1982, pp. 11-20.

(Continued)

*Primary Examiner* — Bryce M Aisaka
(74) *Attorney, Agent, or Firm* — Fenwick & West LLP

(57) ABSTRACT

A security verification system performs security verification of a circuit design. The security verification system simplifies formal security verification of the circuit design by replacing circuit blocks of the circuit with black box circuit blocks. The security verification system instruments the circuit design so that black-boxing can be performed for security verification without changing the security decision over the data paths. The security verification system uses dependence information of the inputs and outputs of the black box to connect inputs of the circuit block with outputs of the circuit block. The black-box circuit block keeps the logic inside the cone of influence of clocks and resets. The system performs security verification of the circuit design by proving a non-interference property of the instrumented circuit design.

20 Claims, 12 Drawing Sheets

(56) References Cited

OTHER PUBLICATIONS

Guo, X. et al., "Pre-Silicon Security Verification and Validation: A Formal Perspective," DAC '15: Proceedings of the 52$^{nd}$ Annual Design Automation Conference, Jun. 2015, six pages.
McFarland, M. C., "Formal Verification of Sequential Hardware: A Tutorial," IEEE Transactions on Computer-Aided Design of Integrated Circuits and Systems, May 1993, pp. 633-654, vol. 12, No. 5.

* cited by examiner

SCALABLE FORMAL SECURITY VERIFICATION OF CIRCUIT DESIGNS

CROSS REFERENCE TO RELATED APPLICATIONS

This application claims a benefit of U.S. Patent Application Ser. No. 62/895,569, filed Sep. 4, 2019, the contents of which are incorporated by reference herein.

TECHNICAL FIELD

This disclosure relates to the field of electronic design automation in general, and more specifically to formal security verification of circuit designs.

BACKGROUND

Electronic design automation processes circuits with increasing design complexity. One of the operations performed during electronic design automation is security verification. Security verification determines whether there are any unexpected or unauthorized ways to read or modify secure data. Security verification is performed at various levels from block-level to system on a chip (SoC) level and also software-level. Hardware security verification is an important aspect of security verification since software security becomes less relevant if the software is executed on insecure hardware. Conventional techniques of hardware security verification are based on code review and simulation. These techniques are not very rigorous. For rigorous security verification of hardware or software, formal verification techniques are used. However conventional formal security verification techniques are very cumbersome and inefficient if performed on large circuits.

SUMMARY

Disclosed is a configuration (e.g., system, method, non-transitory computer readable storage medium storing instructions executable by a processor) for formal security verification of a circuit design. A system receives a circuit design for performing security verification. The complexity of the security verification is reduced by replacing one or more circuit blocks of the circuit design with black box circuit blocks. Accordingly, a circuit block is identified for being replaced with a black box circuit block. The system analyzes the circuit block to determine dependence between outputs and inputs of the circuit block. The system creates an instrumented circuit design that replaces the circuit block with black box circuit blocks. The instrumented circuit design includes two copies of the circuit design, a source signal provided as input to the two copies of the circuit design, and a comparison block that compares the outputs of the two copies. The instrumented circuit design includes a black-box circuit block that replaces the circuit block and connects inputs of the circuit block with outputs of the circuit block according to their dependence. The system performs security verification of the circuit design by proving properties of the instrumented circuit design. For example, the system performs security verification of the circuit design by verifying that the comparison block of the instrumented circuit design outputs a true value independent of values of certain inputs of the circuit design.

In an embodiment, the system determines dependence between outputs and inputs by extracting connectivity information from the inputs to the outputs of the circuit block. The system starts from an output of the circuit block and traverses backwards following a netlist of the circuit block to identify inputs of the circuit block that are connected to the output.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1A:
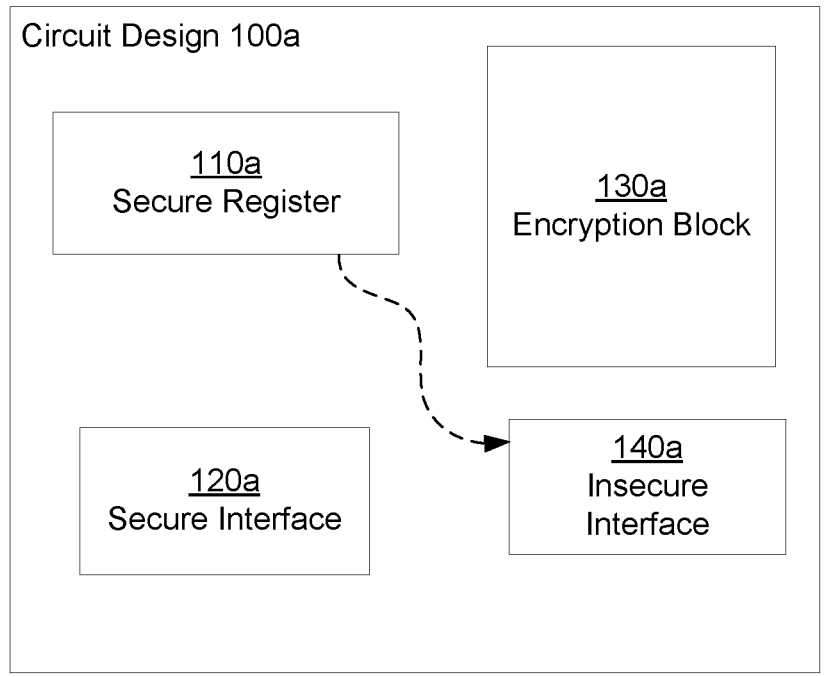
FIG. 1A illustrates the security issue of a security leakage in a circuit design.

A security verification system (also referred to herein as the system) uses formal security verification techniques to establish properties of hardware or software. The security verification system models a circuit as a machine or a system with inputs and outputs which are classified as either non-secret or secret. A non-secret input/output is not highly classified whereas a secret input/output carries sensitive information that may not be accessed by unauthorized users.

FIG. 1 shows example security issues in a circuit design that can be identified by the security verification system. The circuit design 100 includes circuit components including a secure register 110, a secure interface 120, an encryption block 130, and an insecure interface 140. The inputs and outputs of a circuit are classified as either non-secret (low, not highly classified) or secret (high, sensitive, not to be viewed by uncleared individuals).

Figure 1B:
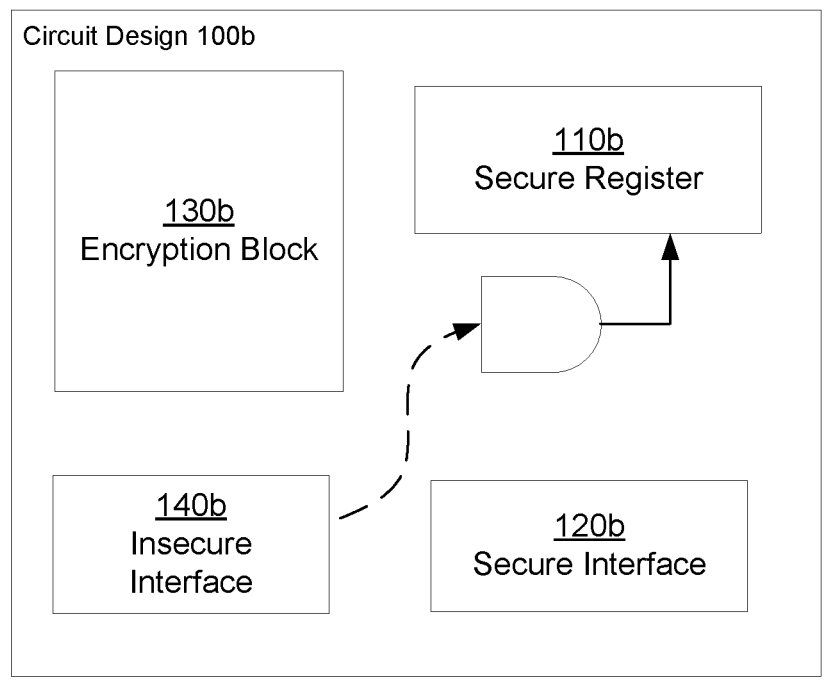
FIG. 1B illustrates the security issue of a insecure write in a circuit design.

FIG. 1A illustrates the security issue of a security leakage in a circuit design. A security leakage occurs if an output value at a secure component is visible to an interface that is not secure. The circuit design 110a has a leakage to an insecure component since the output value at a secure component, e.g., the secure register 110a is visible to an insecure interface 140a. FIG. 1B illustrates the security issue of an insecure write in a circuit design. An insecure write occurs if there are writes to a secure component from insecure sources. The circuit design 110b has an insecure write since the data loaded to the secure register 110b can be impacted by an insecure component, i.e., insecure interface 140b.

The security verification system identifies insecure read and write by determining whether data can go from a particular source location to a particular destination location. Accordingly, the security verification system checks whether a source component can impact the values of a destination component.

Due to its rigorous nature, formal security verification is difficult to perform on large circuits. The security verification system simplifies formal security verification of a circuit design by replacing circuit blocks of the circuit with black box circuit blocks (also referred to as black-boxing). A component or a circuit block is black-box if all its internal logic is empty and only its interface is accessible to any components interacting with it.

Replacing a circuit block with a black box circuit block reduces the size of a circuit design by removing the internal logic of a complex component. However, black-boxing a component can make it difficult to determine the propagation path from a source to a destination. As a result, an insecure data path may be treated as secure if the black-box outputs are treated as unconnected with the inputs. Similarly, a secure path may be treated as insecure if the outputs are universally treated as being connected to the black-box inputs. This is equivalent to adding paths that do not exist in the input circuit design.

The security verification system instruments the circuit design so that black-boxing can be performed without changing the security decision over the data paths. The security verification system creates an instrumented circuit design that includes two copies of the circuit design. A source signal is provided as input to the two copies and a comparison block compares the outputs of the two copies. A circuit block is replaced with a black-box circuit block. The security verification system uses dependence information of the inputs and outputs of the black box to connect inputs of the circuit block with outputs of the circuit block. The system performs security verification of the circuit design by proving properties of the instrumented circuit design.

Replacing circuit blocks of the circuit design with black box circuit blocks reduces the complexity of the circuit design, thereby simplifies the formal security verification of large circuit designs. Accordingly, embodiments improve the computational efficiency of security verification process of circuit designs.

System Architecture of a Security Verification System

The security verification system determines whether a circuit has non-interference property. A circuit has the non-interference property if and only if any sequence of non-secret inputs produces the same non-secret outputs, regardless of the secret inputs. A non-secret input/output may be referred to as low security input/output and a secret input/output may be referred to as a high security input/output. Secret inputs are also referred as secret wires and non-secret outputs are referred to as observing wires. Internal wires can also be secret wires or observing wires. Accordingly, internal wires may also return a secret data, e.g. a decryptor inside a system on chip. Similarly, observing wires are not necessarily primary outputs and can be internal wires. Such generalization allows the security verification system to check the validity of non-interference property for an internal sub-circuit. For example, if secret data from a register propagates to some non-trustworthy internal sub-component (or wire), the security verification system marks the inputs of this sub-component as observing wires.

Figure 2:
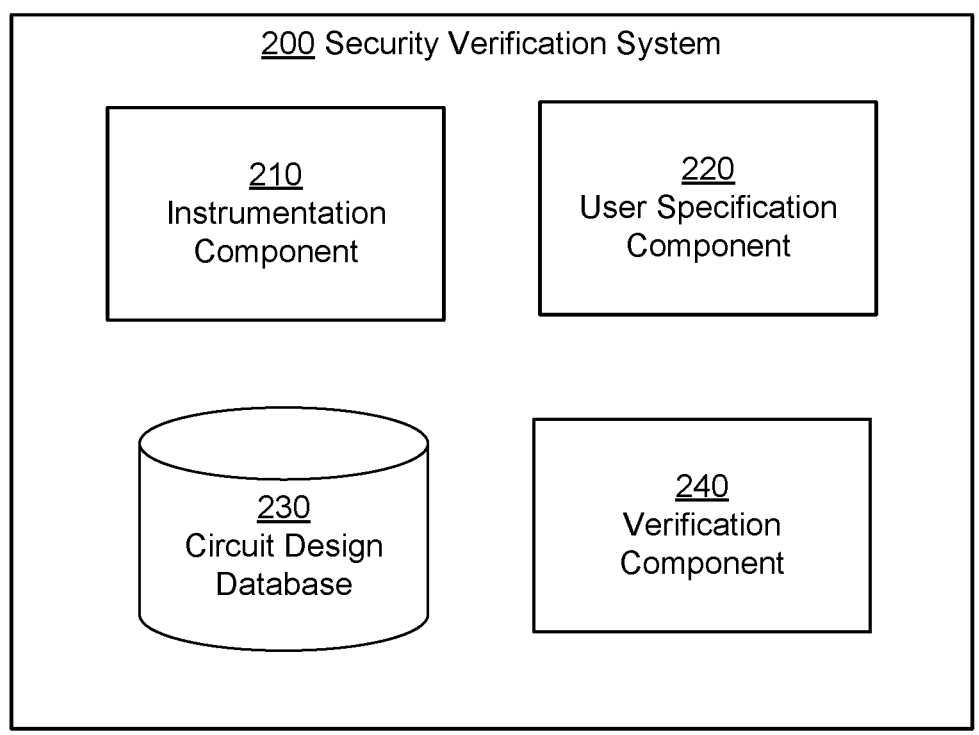
FIG. 2 shows a block diagram of a system architecture of a security verification system according to an embodiment.

FIG. 2 shows a block diagram of a system architecture of a security verification system 200 according to an embodiment. The security verification system 200 includes an instrumentation component 210, a user specification component 220, a circuit design database 230, and a verification component 240. Other embodiments may include more or fewer components than those indicated herein. Functionality indicated herein as being performed by a particular module may be performed by other modules than those indicated herein.

The circuit design database 460 stores circuit designs that are processed by the security verification system. The user specification component 220 receives and analyzes user specification, for example, information describing an input or output or components of the circuit as secure or insecure. The user specification identifies certain wires or inputs/outputs in a circuit design as secret or non-secret wires or input/outputs. The user specification also identifies circuit blocks of the circuit design that should be converted to black box circuit blocks.

The instrumentation component 210 generates instrumented circuit designs from circuit designs received from users. The instrumentation component 210 generates the instrumented circuit designs by replacing one or more circuit blocks with black box circuit blocks that preserve information describing the dependence between inputs and outputs of the circuit block being replaced.

The verification component 240 performs security verification of a received circuit design by analyzing the instrumented circuit design generated by the instrumentation component 210. The processes executed by the components of the security verification system 100 are described in detail below.

The security verification system supports certain commands that allow users to specify whether a wire is a secret wire or observing wire. A wire may represent an input or output of the circuit or a component of the circuit. For example, a mark_secret command marks secret wires, for example, primary inputs/internal wires. These wires propagate secret information, for example, output of ROM with a key, decryptor outputs. A mark_observ command marks observing wires. If the design is secure, secret bits from secret wires do not appear at observing wires.

Figure 3A:
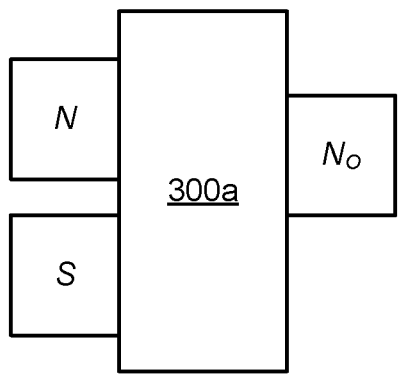
FIG. 3A shows an example circuit design received for performing security verification according to an embodiment.

FIG. 3A shows an example circuit design received for performing security verification according to an embodiment. The security verification system receives a sequential circuit 300a with non-secret (i.e., standard, low, or not classified) inputs N. The security verification system receives a command from a user to mark a group of primary inputs S as secret, for example, using the command <mark_secret S>. The circuit 200*a* includes a group of primary outputs $N_O$ representing observing wires.

The security verification system 200 checks the non-interference property for such circuits as follows. The security verification system 200 modifies the circuit 310 shown in FIG. 3A to obtain the circuit shown in FIG. 3B. The instrumented circuit design includes two copies of the circuit design, a source signal provided as input to the two copies of the circuit design, and a comparison block that compares the outputs of the two copies. The instrumented circuit design includes a black-box circuit block that replaces the circuit block and connects inputs of the circuit block with outputs of the circuit block according to their dependence.

Figure 3B:
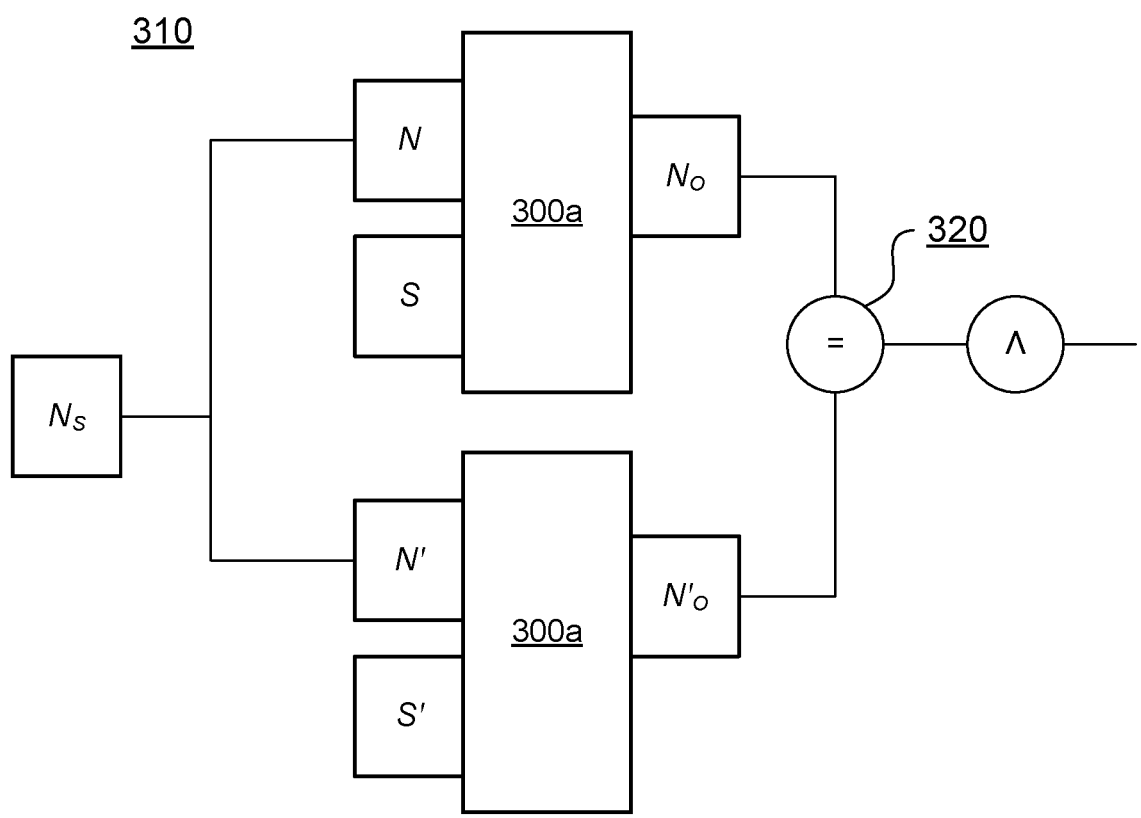
FIG. 3B shows a transformed circuit design for illustrating security verification according to an embodiment.

FIG. 3B shows a transformed circuit design 310 for illustrating security verification according to an embodiment. The corresponding inputs/outputs of the duplicate circuit design are represented using primes, i.e., the non-secure inputs are N', the secure inputs are S', and the non-secure outputs are $N'_O$. The security verification system 200 connects the non-secure inputs N of the circuit 300 and N' of the duplicate circuit 300*b* with the same source $N_s$ so that the two inputs are driven by the same source. The security verification system 200 adds a comparator 330 (also referred to as a comparison block) that receives the non-secure outputs $N_O$ and $N'_O$ of the circuits 300*a* and 300*b* respectively. Accordingly, the transformed circuit design 310 shown in FIG. 3B includes a copy of the circuit and adds components such that the non-secure inputs receive the same signals and the non-secure outputs are compared.

The security verification system 200 determines that circuit 300 has non-interference property if and only if the equation $N_O = N'_O$ always holds for the transformed circuit 310 as shown in FIG. 3B. Accordingly, the circuit 300 has non-interference property if the comparator always returns equality, independent of one or more inputs of the circuit design, for example, the secure inputs S and S'. The security verification system 200 checks the following formal property in the transformed circuit 310 that represents that for all values of the non-secure input N and for all values of secure inputs S of the circuit 300*a* and secure inputs S' of the duplicate circuit 300*b*, the values of the outputs $N_O$ and $N'_O$ are always equal.

$$\forall N \forall S \forall S': (N_O == N'_O)$$

The security verification system 200 verifies the non-interference property by modeling the definition of non-interference, i.e., any sequence of non-secure inputs should produce the same outputs regardless of the secure data. According to an embodiment, the security verification system 200 performs two independent runs in two copies of the same circuit 300. For these two runs, the security verification system 200 uses the same sequence of inputs N. However, the security verification system 200 may use different sequences of secure data S and S' as represented by the quantification VS VS'. The security verification system 200 determines that the circuit has non-interference property if these two runs lead to the same output stream. Accordingly, the security verification system 200 performs security verification by checking whether value changes at the source can impact the value at the destination.

Figure 4:
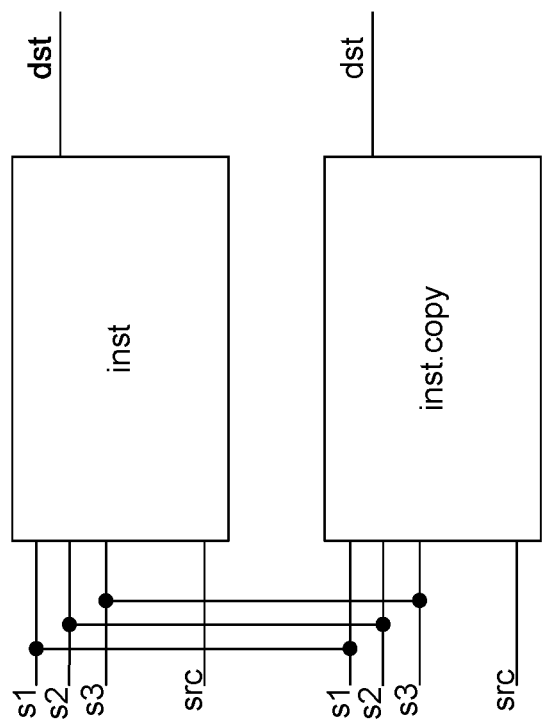
FIG. 4 illustrates the approach of the security verification system according to an embodiment.

FIG. 4 illustrates the approach of the security verification system according to an embodiment. The security verification system 200 creates a copy of the circuit design. For example, as shown in FIG. 4, inst is the received circuit design, and inst.copy is the copy of the circuit design. The circuit design inst has sources s1, s2, s3, and a designated source src. The security verification system 200 connects all the inputs of inst.copy to their counterparts of inst except the designated source, i.e., src. As shown in FIG. 4, the only factor that can result in difference in the destination values is inst.src and inst.copy.src.

The security verification system 200 assigns different symbolic values to src and inst.copy.src, and checks whether the destination signal inst.dst has a value different from the corresponding signal inst.copy.dst of inst.copy. If under certain configuration of signals <s1,s2,s3, . . . >, the outputs inst.dst and inst.copy.dst have different values, then security verification system 200 determines that destination dst can be impacted by source src, and there is an insecure path from source src to destination dst.

Overall Process

Figure 5:
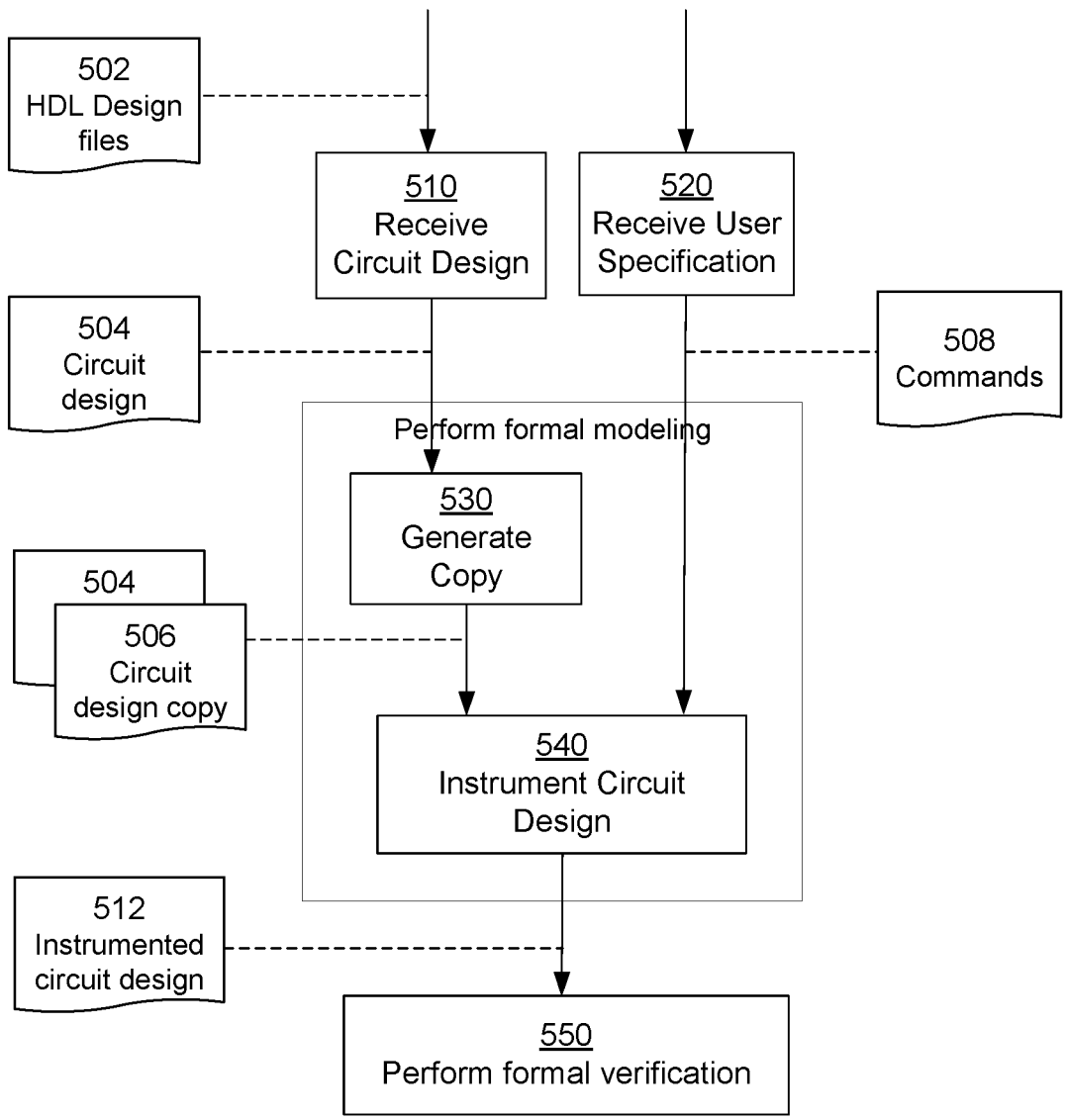
FIG. 5 depicts a flowchart of the process for formal security verification of a circuit design according to an embodiment.

FIG. 5 depicts a flowchart of the process for formal security verification of a circuit design according to an embodiment. The flowchart shows the steps performed as well as the data or the representation of data associated with the steps. The steps are connected by transition arrows. The representation of the data is connected with the transition arrows or by dotted lines. For example, if a data representation R is connected using dotted lines with a transition arrow that connects steps S1 with step S2, the data representation R represents output of steps S1 that is provided as input to step S2. The steps shown in the flowchart of FIG. 5 may be performed in an order different from that indicated in the flowchart. For example, certain steps may be performed in parallel with other steps. Furthermore, various steps shown in the flowchart may be performed using a parallel or distributed system.

The security verification system 200 receives 510 and processes a circuit design. In an embodiment, the security verification system 200 loads circuit design files represented using HDL (hardware definition language) and parses the circuit design files to generate a netlist representation of the circuit design 504.

The security verification system 200 further receives 520 user specification related to formal verification. For example, the user specification includes source and destination nodes of the circuit design using an exemplary command "fsv_generate-src s1-dest d2" that specifies that signal s1 is source and signal d2 is destination. The security verification system 200 assimilates all user input into a user configuration.

The security verification system 200 performs formal modelling including steps 530 and 540. The security verification system 200 generates 530 a copy 506 of the circuit design 504. The design is referred to as D and design copy is referred to as D.copy. Accordingly, D.s1 is a source signal of design D, D.copy.s1 is a source signal of the design copy, D.s1 and D.d2 is a destination signal of design D, and D.copy.s1 is a source signal of the design copy D.copy.

The security verification system 200 instruments 540 the circuit design and circuit design copy as illustrated in FIG. 4. For example, the security verification system 200 leaves the source signal as free variables, connects other input signals, and generates an expression D.d2==D.copy.d2 for formal verification. The output of the step 540 is the instrumented circuit design 512. The security verification system 200 performs 550 formal verification using the instrumented circuit design 512 to prove the property D.d2==D.copy.d2.

Figure 6:
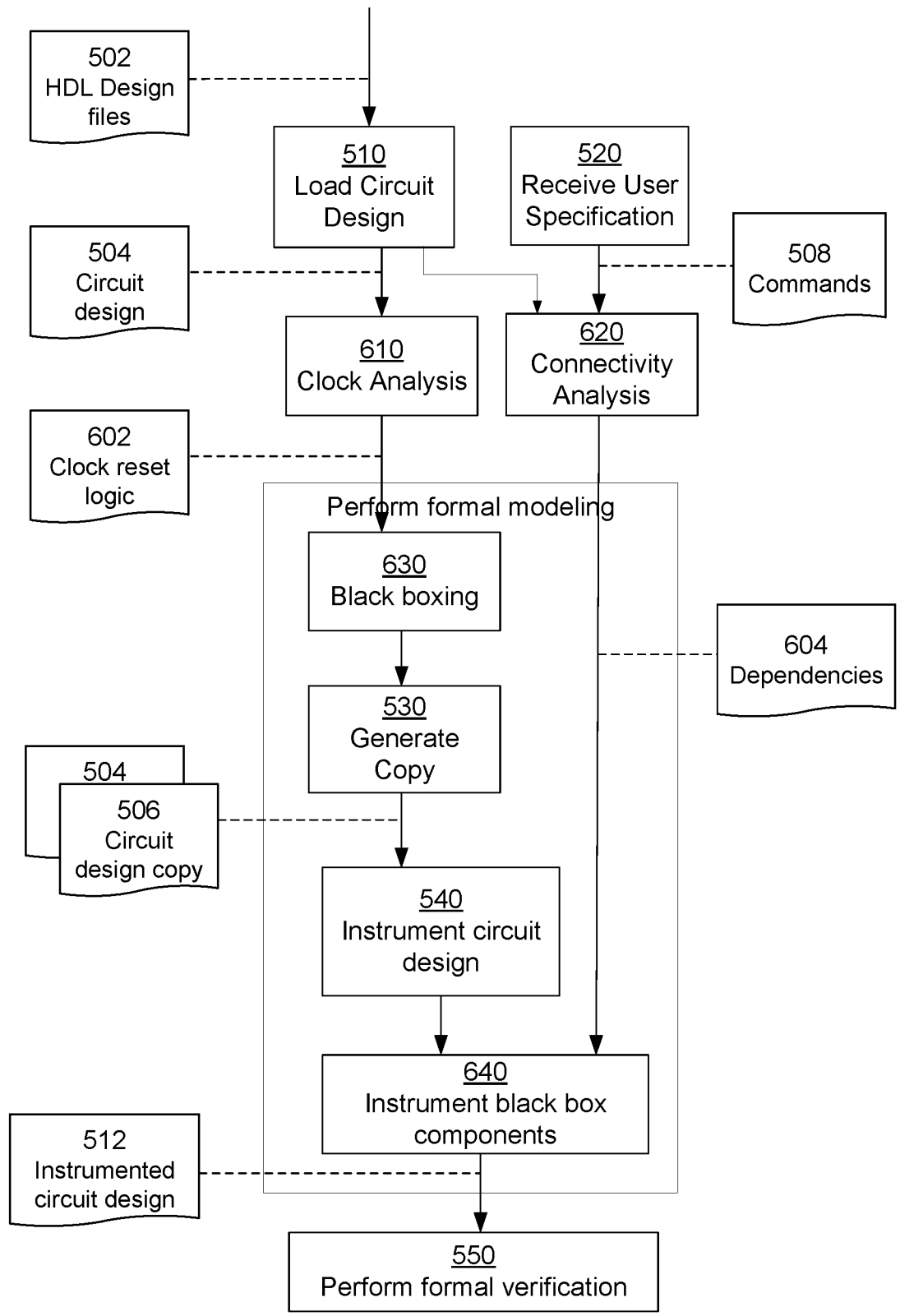
FIG. 6 depicts a flowchart of the process for formal security verification of a circuit design with black box components according to an embodiment.

FIG. 6 depicts a flowchart of the process for formal security verification of a circuit design with black box components according to an embodiment. The steps of FIG. 6 correspond to steps of FIG. 5 with additional steps included for handling black box components.

The security verification system 200 receives 510 and processes a circuit design. The security verification system 200 receives 520 user specification including commands describing the circuit design for performing formal security verification. For example, the security verification system 200 receives user specification describing black box components of the circuit design in addition to specification describing the source and destination signals. For example, a black box command specifies the components of the circuit to be modelled as a black-box component. An example command is "fsv_blackbox b" that identifies a component b that is modelled as a black box component.

The security verification system 200 performs 610 connectivity analysis of the circuit design. As a result of connectivity analysis, the security verification system 200 determines dependencies 640 between signals at various nodes of the circuit design. Accordingly, the security verification system 200 extracts the connectivity from the black-box component inputs to the black-box component outputs. The connectivity describes how a black-box component output depends on the black-box component inputs.

Figure 7:
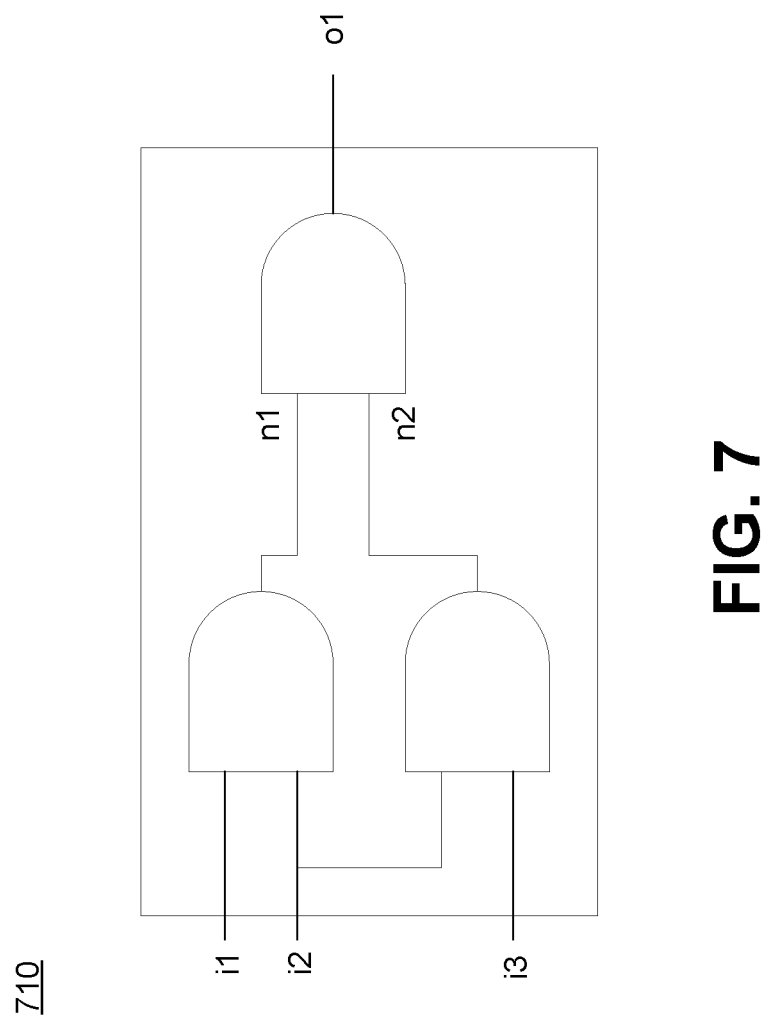
FIG. 7 shows an example black box component for illustrating connectivity analysis according to an embodiment.

FIG. 7 shows an example black box circuit block to illustrate connectivity analysis according to an embodiment. The security verification system 200 analyzes a circuit block (also referred to as a component or an instance) that includes specification of its internal logic by applying a structural analysis from the outputs. The security verification system 200 traverses from black-box component output in a backward manner along the drivers until it reaches the black-box component inputs. For example, in FIG. 7, b1.$n1$ an b1.$n2$ are drivers of b1.$o1$, b1.$i1$ and b1.$i2$ are the drivers of b1.$n1$, and b1.$i2$ and b1.$i3$ are the drivers of b1.$n2$. Accordingly, security verification system 200 starts traversing from output b1.$o1$, to reach b1.$n1$ and b1.$n2$ first, and then b1.$i1$, b1.$i2$, and b1.$i3$. For example, the security verification system 200 represents the dependencies between outputs and inputs of the black-box component as Dep(b1.$o1$)={b1.$i1$, b1.$i2$, b1.$i3$}, indicating that output b1.$o1$ depends on inputs b1.$i1$, b1.$i2$, b1.$i3$. For a generic black-box, in which the internal logic is unavailable after loading the circuit design 504, the security verification system 200 is not able to analyze the connectivity and assumes that a black-box output depends on all the inputs of the black-box component.

The security verification system 200 performs 610 clock analysis of the circuit design. The security verification system 200 identifies components within a circuit block that represent a cone of influence of clocks and resets associated with the circuit block. A cone of influence of a signal represents the set of signals from which there exists a path to that signal. Similar to the step 620 that performs connectivity analysis, the security verification system 200 performs clock analysis by performing a backward structural analysis. The security verification system 200 performs a traversal that starts from the clock pins and the reset pins of each flip-flop of the design until it reaches the primary inputs. The logic components visited in this traversal are collected in clock reset logic 602. The security verification system 200 includes the identified components representing the cone of influence in the instrumented circuit design.

The security verification system 200 performs formal modelling including steps 630, 530, 540, and 640. The security verification system 200 performs 630 black boxing, by converting the components specified in the user specification (for example, using command fsv_blackbox) into a black-box component. The security verification system 200 keeps the internal logics of the black box component, provided the internal logic was included in the clock reset logic 602.

The security verification system 200 generates 530 a copy 506 of the circuit design 504. The security verification system 200 instruments 540 the circuit design and circuit design copy as illustrated in FIG. 4. The security verification system 200 instruments 640 the black box components. The security verification system 200 performs 550 formal verification using the instrumented circuit design 512.

Figure 8:
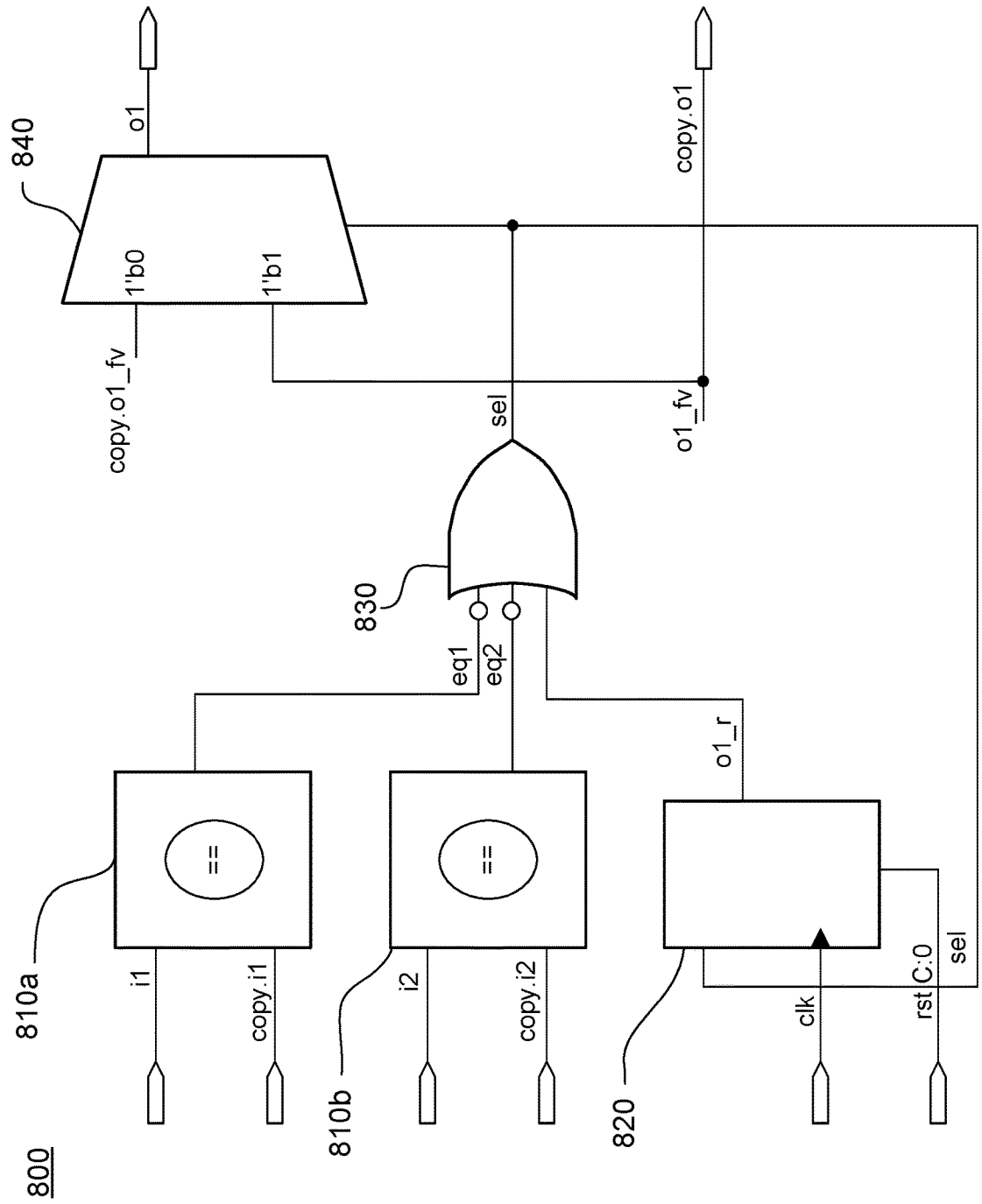
FIG. 8 shows an example a circuit design to illustrate combinational mode instrumentation for the propagation path according to an embodiment.

FIG. 8 shows an example a circuit design 800 to illustrate combinational mode instrumentation for the propagation path according to an embodiment. The instrumented circuit design includes comparator 810$a$ that compares the inputs i1 and copy.i1 and comparator 810$b$ that compares the inputs i2 and copy.i2.

After instrumenting 540 the circuit design, the security verification system 200 instruments 640 a circuit block identified for being black boxed by replacing the circuit block with new circuit paths connecting the black-box inputs and the outputs. The security verification system 200 includes a pair of inputs for each input of the circuit block and a pair of outputs for each output of the circuit block being black-boxed. The values of the pair of outputs are guaranteed to be equal if the corresponding pair of inputs has equal values. Correspondingly, the values of the pair of outputs are not guaranteed to be equal if the corresponding pair of inputs has different values or if the corresponding inputs had different values in the past during this execution of the circuit design. The instrumented circuit design includes a component 820 that stores state indicating whether a pair of inputs had different values any time in the past. The instrumented circuit design includes comparators 810 for comparing each pair of inputs. The instrumented circuit design includes a multiplexer 840 for each output of the circuit block. The select input of the multiplexer 840 for selecting the output of the multiplexer is controlled by the component 820 that stores the state indicating whether a pair of inputs had different values any time in the past. In an embodiment, the instrumented circuit design is configured according to a combinational mode shown in FIG. 8 such that the outputs of the black-box circuit block are determined based on their corresponding inputs within one clock cycle. In another embodiment, the instrumented circuit design is configured according to a sequential mode such that the outputs of the black-box circuit block are determined based on their corresponding inputs after at least one clock cycle.

An example schema of the new paths is illustrated in FIG. 8 that shows i1 and i2 inputs, of is the output being analyzed, and Dep(o1)={i1, i2} indicates that there is a dependency from output o1 to inputs i1 and i2 based on the connectivity analysis of operation 620. The signal eq1 output by comparator 810$a$ compares the value of i1 and copy.i1 and is false if the value of signal i1 is not equal to the value of signal copy.i1. The signal eq2 output by comparator 810$b$ compares the value of i2 and copy.i2 and is false if the value of signal i2 is not equal to the value of signal copy.i2. Consequently, signal se1 output by gate 830 is true if either eq1 or eq2 is false.

The assertion of se1 sets the value of the register 820 that generates signal o1_$r$ to true, and o1_$r$ stays true once it is set to true. Signal o1_$r$ is also the third input to the gate 830 representing the disjunction expression that determines se1. The holding of the value of se1 indicates that, at some point in time, a value difference was observed between i1 and copy.i1, or i2 and copy.i2. The signal sel1 provides the select signal of the multiplexer 840 and selects the driver of o1. If sel1 is false, o1 is determined by copy.o1_fv which is an undriven free variable. As a result, both o1 and copy.o1 have an identical value. If signal sel1 is true, the signal o1 is determined by o1_fv which is a free variable independent of signal copy.o1_fv. As a result, o1 may have a value different from copy.o1 in the formal verification. As a result, any value difference in the black-box inputs is propagated to the outputs. This instrumented circuit design 800 is referred to as a combinational mode, since there is no propagation delay from the inputs to the outputs.

Figure 9:
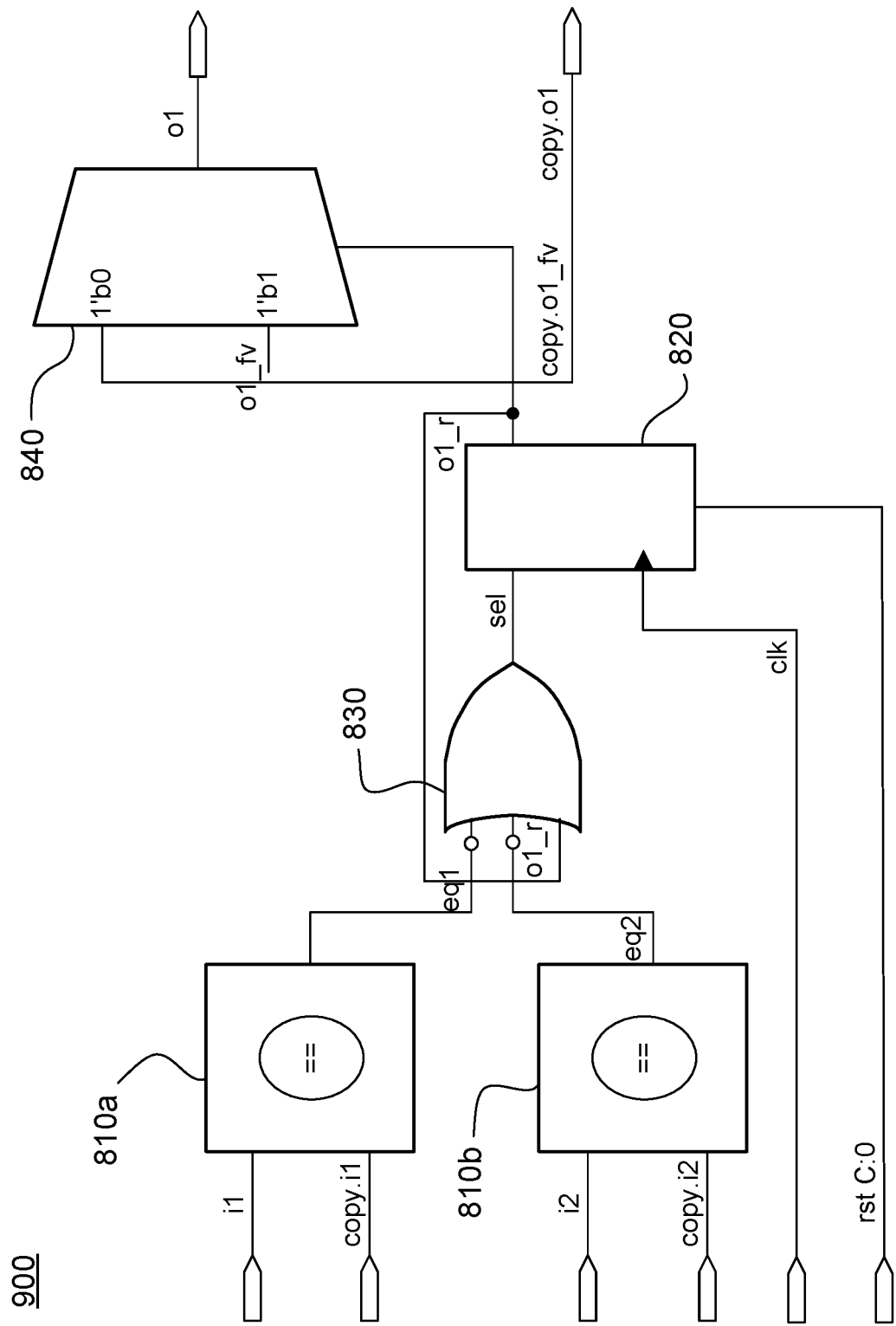
FIG. 9 shows an example a circuit design to illustrate sequential mode instrumentation for the propagation path according to an embodiment.

FIG. 9 shows an example a circuit design 900 to illustrate sequential mode instrumentation for the propagation path according to an embodiment. In some circuit designs, there are paths from the black-box outputs back to the inputs without a sequential element in the middle. The combinational mode instrumentation as illustrated in FIG. 8 may bring an asynchronous loop. According to an embodiment, a sequential mode instrumentation is used to avoid such an asynchronous loop, as illustrated in FIG. 9. As shown in FIG. 9, the multiplexer 840 select signal is driven directly by the register 820 output o1_r. Thus, the output values are different one cycle after the difference observed in the input side.

In an embodiment, the security verification system 200 determines the number N of cycles by which the signal is delayed between inputs and outputs of a circuit block identified for black-boxing. The security verification system 200 generates an instrumented circuit design based on a sequential mode in which the select signal of the multiplexer 840 is delayed by N cycles by introducing N flipflops in the path from input to output of the circuit block.

Figure 10:
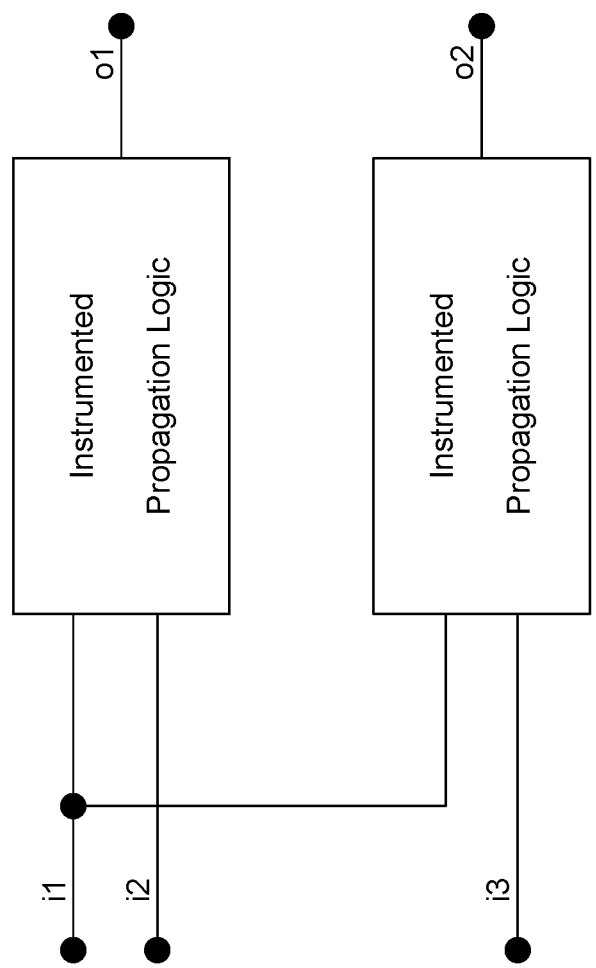
FIG. 10 shows an example a circuit design to illustrate replacement of complex logic with instrumented propagation logic according to an embodiment.

FIG. 10 shows an example a circuit design to illustrate replacement of complex logic with instrumented propagation logic according to an embodiment. The security verification system 200 instruments 640 the black-box components of the circuit design by replacing each black-box component with the propagation logic that connects each black-box output with its dependent input based on the propagation mode. Accordingly, the complex logic of a big module is replaced with instrumented logics capturing the propagation from the inputs to the outputs. This allows the formal verification of a circuit design to be performed using an instrumented circuit design that is simpler and has fewer components, thereby improving the execution time of the formal security verification process.

Electronic Design Automation Process

Figure 11:
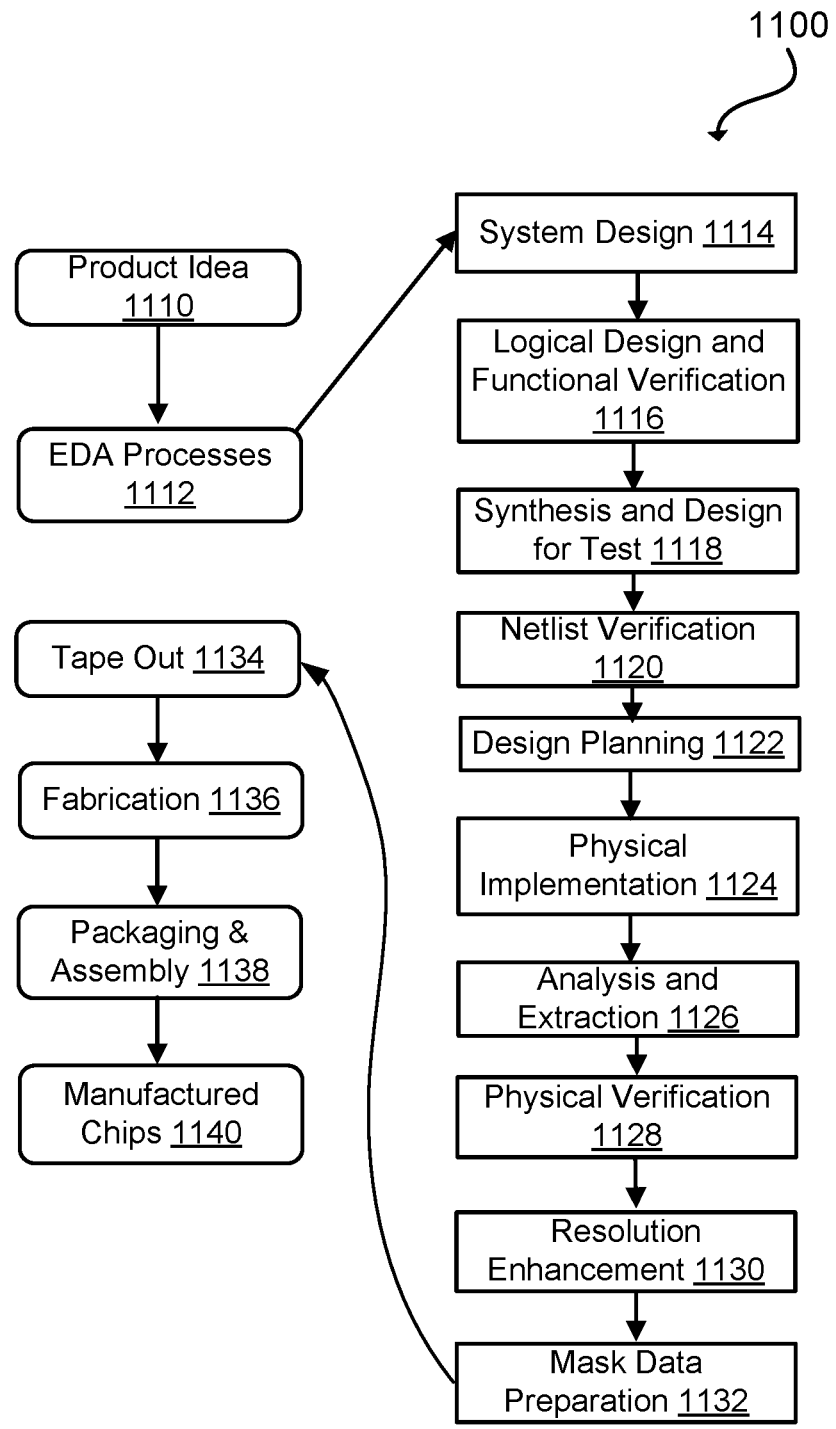
FIG. 11 depicts a flowchart of various processes used during the design and manufacture of an integrated circuit in accordance with some embodiments.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 11. The processes described by be enabled by EDA products (or tools).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system may be used to store the programs and data structures that are used by some or all of the EDA products described herein, and products used for development of cells for the library and for physical and logical design that use the library.

Embodiments can be used for processing the circuit designs during various stages of the electronic design automation process that store the circuit layout, for example, layout or physical implementation 1124, analysis and extraction 1126, mask data preparation 1132, and so on.

Computer Architecture

Figure 12:
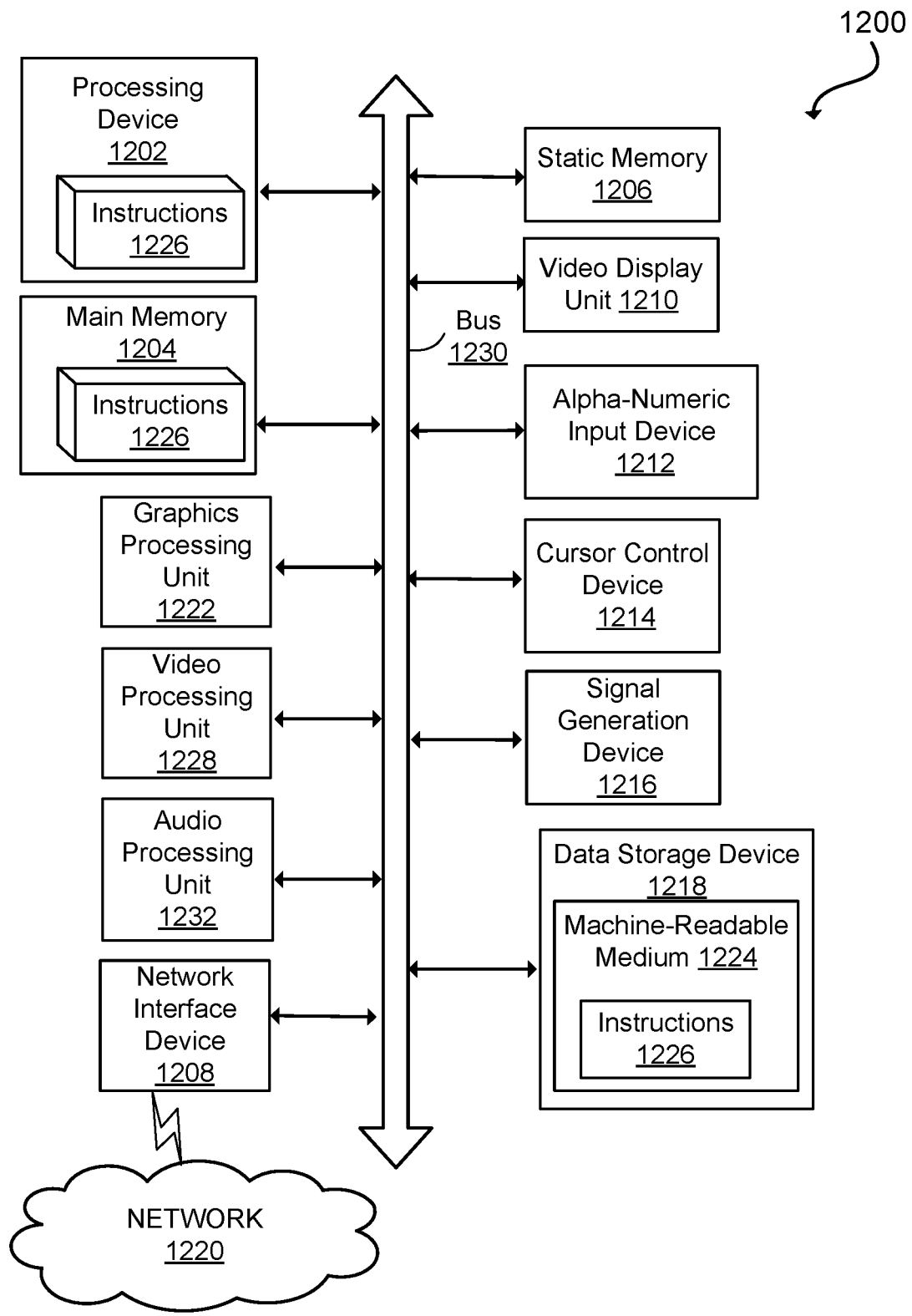
FIG. 12 depicts an abstract diagram of an example computer system in which embodiments may operate.

FIG. 12 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for security verification of a circuit design, the method comprising:
   receiving a request to perform security verification of the circuit design;
   identifying a circuit block of the circuit design for being replaced with a black box circuit block;
   identifying one or more components of the circuit block that represent a cone of influence of clocks and resets associated with the circuit block;
   creating an instrumented circuit design comprising:
      two copies of the circuit design;
      a source signal provided as input to the two copies of the circuit design;
      a comparison block that compares the outputs of the two copies of the circuit design; and
      a black-box circuit block replacing both the circuit blocks from the two copies of the circuit design, the black-box circuit block comprising the one or more components representing the cone of influence, the black-box circuit block connecting inputs and outputs of the circuit blocks based on a dependence between the inputs and outputs of the circuit blocks; and
   performing, by a processing device, security verification of the circuit design by proving a property of the instrumented circuit design.

2. The method of claim 1, wherein performing security verification of the circuit design comprises verifying that the comparison block of the instrumented circuit design outputs a true value independent of values of one or more inputs of the circuit design.

3. The method of claim 1, wherein the black-box circuit block is configured to include a pair of inputs for each input of the circuit block and a pair of outputs for each output of the circuit block.

4. The method of claim 3, wherein the black-box circuit block is configured such that the values of the pair of outputs are equal if the corresponding pair of inputs has equal values.

5. The method of claim 3, wherein the black-box circuit block is configured such that the values of the pair of outputs are unequal if the corresponding pair of inputs has different values.

6. The method of claim 3, wherein the black-box circuit block is configured such that the values of the pair of outputs are unequal if the corresponding inputs had different values in the past.

7. The method of claim 3, wherein the black-box circuit has a component that stores state indicating whether a pair of inputs had different values any time in the past.

8. The method of claim 3, wherein the black box circuit block includes a comparator for comparing each pair of inputs.

9. The method of claim 8, wherein the black box circuit block includes a multiplexer for each output of the circuit block.

10. The method of claim 9, wherein a select input of a multiplexer for an output of the circuit block is controlled by a component that stores state indicating whether a pair of inputs had different values any time in the past.

11. The method of claim 1, identifying a circuit block of the circuit design for being replaced with a black box circuit block is responsive to receiving a command identifying the inputs and outputs of the circuit block.

12. The method of claim 1, wherein the black-box circuit block has fewer components than the circuit block.

13. The method of claim 1, wherein the black-box circuit block is configured according to a combinational mode such that the outputs of the black-box circuit block are determined based on their corresponding inputs within one clock cycle.

14. The method of claim 1, wherein the black-box circuit block is configured according to a sequential mode such that the outputs of the black-box circuit block are determined based on their corresponding inputs after at least one clock cycle.

15. The method of claim 1, further comprising:
determining dependence between outputs and inputs of the circuit by extracting connectivity information from the inputs to the outputs of the circuit block by starting from an output of the circuit block and traversing backwards following a netlist of the circuit block to identify inputs of the circuit block that are connected to the output.

16. A non-transitory storage medium storing instructions that when executed by a processor, cause the processor to perform operations for performing security verification for a circuit design, the operations comprising:
receiving a request to perform security verification of the circuit design;
identifying a circuit block of the circuit design for being replaced with a black box circuit block;
identifying one or more components of the circuit block that represent a cone of influence of clocks and resets associated with the circuit block;
creating an instrumented circuit design comprising:
two copies of the circuit design;
a source signal provided as input to the two copies of the circuit design;
a comparison block that compares the outputs of the two copies of the circuit design; and
a black-box circuit block replacing both the circuit blocks from the two copies of the circuit design, the black-box circuit block comprising the one or more components representing the cone of influence, the black-box circuit block connecting inputs and outputs of the circuit blocks based on a dependence between the inputs and outputs of the circuit blocks; and
performing, by a processing device, security verification of the circuit design by proving a property of the instrumented circuit design.

17. The non-transitory storage medium of claim 16, wherein the black-box circuit block is configured to include a pair of inputs for each input of the circuit block and a pair of outputs for each output of the circuit block, wherein the black-box circuit block is configured such that the values of the pair of outputs are equal if the corresponding pair of inputs has equal values, wherein the black-box circuit block is configured such that the values of the pair of outputs are unequal if the corresponding inputs had different values in the past.

18. The non-transitory storage medium of claim 16, wherein the black-box circuit has a component that stores state indicating whether a pair of inputs had different values any time in the past.

19. The non-transitory storage medium of claim 16, wherein the black box circuit block includes a multiplexer for each output of the circuit block.

20. A system comprising:
a processor; and
a non-transitory storage medium storing instructions that when executed by the processor, cause the processor to perform operations for performing security verification for a circuit design, the operations comprising:
receiving a request to perform security verification of the circuit design;
identifying a circuit block of the circuit design for being replaced with a black box circuit block;
identifying one or more components of the circuit block that represent a cone of influence of clocks and resets associated with the circuit block;
creating an instrumented circuit design comprising:
two copies of the circuit design;
a source signal provided as input to the two copies of the circuit design;
a comparison block that compares the outputs of the two copies of the circuit design; and
a black-box circuit block replacing both the circuit blocks from the two copies of the circuit design, the black-box circuit block comprising the one or more components representing the cone of influence, the black-box circuit block connecting inputs and outputs of the circuit blocks based on a dependence between the inputs and outputs of the circuit blocks; and
performing, by a processing device, security verification of the circuit design by proving a property of the instrumented circuit design.

* * * * *